United States Patent
Bolan et al.

(10) Patent No.: US 7,886,027 B2
(45) Date of Patent: Feb. 8, 2011

(54) METHODS AND ARRANGEMENTS FOR ACTIVATING IP CONFIGURATIONS

(75) Inventors: Joseph E. Bolan, Cay, NC (US); Thomas M. Brey, Cary, NC (US); Brandon J. Ellison, Raleigh, NC (US); Aaron E. Merkin, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 11/279,864

(22) Filed: Apr. 14, 2006

(65) Prior Publication Data

US 2007/0244994 A1    Oct. 18, 2007

(51) Int. Cl.
*G06F 15/177* (2006.01)

(52) U.S. Cl. ............... 709/220; 709/221; 709/222; 709/226

(58) Field of Classification Search ............ 709/226
See application file for complete search history.

(56) References Cited

U.S. PATENT DOCUMENTS

| | | | |
|---|---|---|---|
| 6,115,545 A * | 9/2000 | Mellquist | 709/220 |
| 6,691,170 B1 * | 2/2004 | Gitlin et al. | 709/245 |
| 6,694,367 B1 * | 2/2004 | Miesbauer et al. | 709/227 |
| 6,697,360 B1 | 2/2004 | Gai et al. | |
| 6,718,383 B1 | 4/2004 | Hebert | |
| 7,035,915 B1 * | 4/2006 | Huo et al. | 709/219 |
| 7,184,751 B1 * | 2/2007 | Davis et al. | 455/410 |
| 7,227,838 B1 * | 6/2007 | O'Riordan | 370/219 |
| 7,379,979 B2 * | 5/2008 | Huo et al. | 709/219 |
| 7,441,043 B1 * | 10/2008 | Henry et al. | 709/238 |
| 7,529,815 B2 * | 5/2009 | Droms | 709/220 |
| 7,602,756 B2 * | 10/2009 | Gu et al. | 370/338 |
| 2002/0055991 A1 * | 5/2002 | Arrouye et al. | 709/220 |
| 2003/0028650 A1 | 2/2003 | Chen et al. | |
| 2003/0061315 A1 * | 3/2003 | Jin | 709/220 |
| 2003/0065757 A1 | 4/2003 | Mentze et al. | |
| 2004/0073712 A1 * | 4/2004 | Larson et al. | 709/249 |
| 2004/0073883 A1 * | 4/2004 | DeGarmo et al. | 716/17 |
| 2004/0114559 A1 | 6/2004 | Wang | |
| 2004/0116140 A1 | 6/2004 | Babbar et al. | |
| 2004/0255000 A1 * | 12/2004 | Simionescu et al. | 709/208 |
| 2004/0266479 A1 * | 12/2004 | Oak | 455/557 |

(Continued)

FOREIGN PATENT DOCUMENTS

JP    2006157309 A  *  6/2006

*Primary Examiner*—Firmin Backer
*Assistant Examiner*—Hamza Algibhah
(74) *Attorney, Agent, or Firm*—Cynthia G. Seal; Schubert Law Group PLLC

(57) ABSTRACT

Methods and arrangements for activating Internet Protocol (IP) configurations are discussed. Embodiments include transformations, code, state machines or other logic for activating in an end node an IP configuration suitable for IP communications between the end node and another end node upon the detection of a direct IP connection of the end node to another end node. In some embodiments, the other end node may have a direct IP connect only to the end node. In some embodiments, the suitable IP configuration may involve a static IP address which has been published. In some embodiments, detecting a direct IP connection with another node may be accomplished by detecting a crossed-over Ethernet connection. In some embodiments, an operating system device driver may activate the suitable IP configuration. In other embodiments, an embedded system may activate the suitable IP configuration.

20 Claims, 4 Drawing Sheets

U.S. PATENT DOCUMENTS

| | | |
|---|---|---|
| 2005/0018600 A1* | 1/2005 | Tornar .................... 370/216 |
| 2005/0027834 A1* | 2/2005 | Chen et al. .............. 709/222 |
| 2005/0048924 A1* | 3/2005 | Nelson et al. ......... 455/67.11 |
| 2005/0114880 A1* | 5/2005 | Gould ........................ 725/25 |
| 2005/0198401 A1* | 9/2005 | Chron et al. ............. 709/250 |
| 2005/0240648 A1* | 10/2005 | Bird et al. ................ 709/200 |
| 2005/0281191 A1* | 12/2005 | McGee et al. ............ 370/216 |
| 2006/0034272 A1* | 2/2006 | Kawakami et al. ...... 370/389 |
| 2006/0053276 A1* | 3/2006 | Lortz et al. .................. 713/2 |
| 2006/0112188 A1* | 5/2006 | Albanese et al. ......... 709/238 |
| 2006/0123133 A1* | 6/2006 | Hrastar ...................... 709/238 |
| 2006/0168164 A1* | 7/2006 | Lemson et al. ........... 709/221 |
| 2006/0195569 A1* | 8/2006 | Barker ....................... 709/224 |
| 2006/0220876 A1* | 10/2006 | Campero et al. ........ 340/572.7 |
| 2006/0234543 A1* | 10/2006 | Chen ......................... 439/502 |
| 2006/0267857 A1* | 11/2006 | Zhang et al. ............... 345/1.1 |
| 2007/0203999 A1* | 8/2007 | Townsley et al. ......... 709/207 |
| 2007/0206491 A1* | 9/2007 | Geile et al. ................ 370/203 |
| 2007/0206566 A1* | 9/2007 | Bennett ..................... 370/352 |
| 2007/0217434 A1* | 9/2007 | Welbourn .................. 370/401 |
| 2007/0233825 A1* | 10/2007 | Brownell et al. .......... 709/220 |
| 2008/0052401 A1* | 2/2008 | Bugenhagen et al. ..... 709/227 |
| 2008/0279179 A1* | 11/2008 | Baker ........................ 370/359 |
| 2008/0307488 A1* | 12/2008 | Hammond et al. ............ 726/1 |

* cited by examiner

METHODS AND ARRANGEMENTS FOR ACTIVATING IP CONFIGURATIONS

FIELD

The present invention is in the field of computer networks. More particularly, the present invention relates to methods and arrangements for activating Internet Protocol configurations.

BACKGROUND

Internet Protocol (IP) addresses are used to designate the destination of IP communications. An IP address serves a purpose for network communications similar to a street address for mail. In order for a device connected to an IP network (node) to communicate over the network with another node through an Internet Protocol, each node must have an IP address, and each node must reference the IP address of the other node. Further, each node must be configured such that it is capable of determining a route to each other node with which it wishes to communicate. The IP address configuration information necessary to determine routes to other nodes for the purposes of communication form an IP Configuration for a node.

There are several methods to provide a node on a network with an IP Configuration. A node new to the network or which has been set to a factory default state may have a well known default IP configuration; for example, an address on a non-routable network. Alternatively, the IP network may utilize a Dynamic Host Configuration Protocol (DHCP) server. The DHCP server may have available a pool of IP addresses and may assign an address from the pool to the node for a session on the IP network. In this case, the node must be configured to accept an IP address from a DHCP server. As another alternative, some combination of DHCP and default configuration may be used to assign a node an IP Configuration.

A system administrator may require the IP address of a node in order to configure it. Typically, a system administrator directly or via systems management software may configure an IP device or node in order to enforce compliance of the device with the policies or behaviors of the network. The system administrator may manage devices from a central location through an IP network interface. For example, many IP devices such as a BladeCenter Management Module or a Switch Module support an Ethernet interface for access by an administrator or management software. The network interface enables remote access to the device over an IP network that is segmented into a private management network for security reasons.

The methods of providing IP addresses may not provide a working IP address known to the administrator. When a default configuration is utilized, the configuration is almost never correct for the network the device is located on. In this case, an administrator may manually configure the device with an IP configuration suitable for the management network using a priori knowledge of the IP network. The administrator may then access the device via a local network connection because the administrator knows the IP address. Similarly, when a combination of DHCP and default addresses is used, the device may attempt to obtain an IP address from a DHCP server. If that fails, the device may revert back to the default configuration. Again, the administrator may be required to manually access and configure the device over a local connection.

Even after the device or node is configured, similar problems might occur with the administrator later accessing the node. Although the administrator now has remote access over an IP network, the administrator may require local access. On occasion, the administrator might need to visit the facility where the equipment is actually located in order to address a specific problem. The administrator may take a laptop containing management software to the facility to execute the software against the device. For example, the administrator may need to execute diagnostic tests that require access to the device hardware. Frequently, in these locations, network access is unavailable to the administrator. There may be no Ethernet ports available for the laptop, the environment may be utilizing static IP configuration, or a DHCP reservation system may not supply an IP address to the administrator's machine. In these cases, the administrator may utilize a crossover cable to communicate with the device or node. The administrator may connect a cable directly from the Ethernet port of the laptop to the Ethernet port of the device. Even after making the physical connection, however, the administrator must still establish an IP network connection between the laptop and the device. In order to do so, the administrator must still determine a usable IP address of the device or node.

If the device has a known static IP address, the administrator may use that IP address. Otherwise, the administrator may be required to manually access the device to configure it with a known IP address. The manual configuration may be time consuming and may require the administrator to have detailed knowledge of the particular operating system and Internet options available on the device. In addition, gaining physical access to the device may be awkward. The device may, for example, consist of a module or a blade server which is packed in with other modules in a blade chassis. In addition, the device may be lacking ordinary IO devices, making assignment of an IP configuration difficult. For example, it may be a blade server operating "head-less" without local console, keyboard, and mouse.

SUMMARY OF THE INVENTION

The problems identified above are in large part addressed by methods and arrangements for activating Internet Protocol (IP) configurations. One embodiment provides a method for activating IP configurations. The method may involve maintaining a first IP configuration for an end node of an IP network, maintaining a second IP configuration for the end node for IP communications directly between end nodes, detecting a direct IP connection between the end node and another end node, and activating the second IP configuration based upon the detection.

Another embodiment provides an apparatus for activating IP configurations. The apparatus may comprise an IP connection detector to detect a direct IP connection between a first between a first end node and a second end node. The apparatus may also comprise an IP configuration manager to maintain a first IP configuration for IP communications between the first end node and the second end node in a first IP network and to maintain a second IP configuration for the connection of the first end node to another IP network. The IP configuration manager may also be configured to activate the first IP configuration based upon the detection.

Another embodiment provides machine-accessible medium containing instructions for activating IP configurations which when the instructions are executed by a machine, cause said machine to perform operations. The operations may involve maintaining a first IP configuration for an end node of an IP network, maintaining a second IP configuration for the end node for IP communications directly between end nodes, detecting a direct IP connection between the end node and another end node, and activating the second IP configuration based upon the detection.

BRIEF DESCRIPTION OF THE DRAWINGS

Advantages of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements for activating Internet Protocol (IP) configurations are contemplated. Embodiments include transformations, code, state machines or other logic for activating in an end node of an IP network an IP configuration suitable for IP communications between the end node and another end node upon the detection of a direct IP connection of the end node to another end node. In some embodiments, the other end node may have a direct IP connect only to the end node. In some embodiments, the suitable IP configuration may involve a static IP address which has been published. In some embodiments, detecting a direct IP connection with another node may be accomplished by detecting a crossed-over Ethernet connection. In alternate embodiments, detecting a direct IP connection to another node may be accomplished by use of a spanning tree algorithm. In some embodiments, an operating system device driver may activate the suitable IP configuration. In other embodiments, an embedded system may activate the suitable IP configuration. In still other embodiments, the suitable IP configurations may be activated under the control of BIOS. While specific embodiments will be described below with reference to particular circuit or logic configurations, those of skill in the art will realize that embodiments of the present invention may advantageously be implemented with other substantially equivalent configurations.

Figure 1:
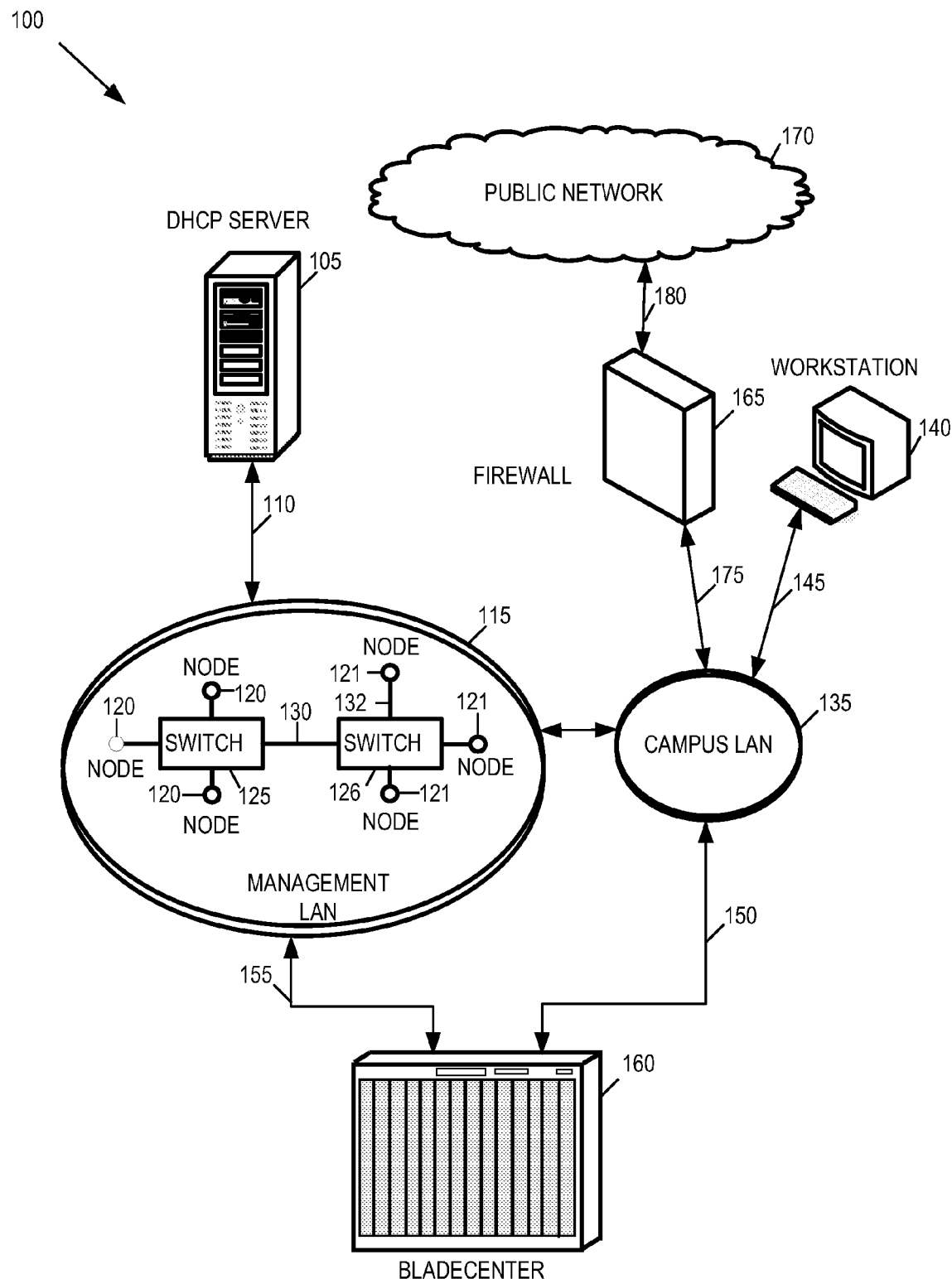
FIG. 1 depicts an embodiment of a group of interconnected networks.

FIG. 1 depicts an embodiment of a group of interconnected networks 100 with a management LAN (local area network) 115, a campus LAN 135, a public network 170, an IBM ®server® BladeCenter™ 160, a firewall 165, and a Dynamic Host Configuration Protocol (DHCP) server 105. The group of interconnected networks 100 may represent a setup for the BladeCenter™ 160. The segregation of the LANs 115 and 135 may provide security, increased bandwidth, and increased speed for communications between nodes 120, 121, and 140 in the LANs 115 and 135. The placing of firewall 165 between public network 170 and the LANs 115 and 135 may provides a layer of protection to the LANs 115 and 135. In addition, the IP addresses of some of the nodes 120, 121, and 140 in LANs 115 and 135 may be private IP addresses, known within LANs 115 and 135 but not known in public network 170.

Networks 115, 135 and 170 may be connected by routers, devices which relay messages across networks. A router may read a destination IP address for a message, determine the destination network from the address, determine a path for the message, and send the message to another router or other device which forwards network messages for further processing. An IP address which is recognizable by a router; that is, an IP address from which a router can identify a network, is said to be a routable address. Private addresses which are not recognized by routers are non-routable.

BladeCenter 160 may consist of a chassis with a group of blades or stripped down computers. The chassis may contain input/output devices for the blades. The chassis may also contain a management module, a network-connected device which oversees the operation of the BladeCenter, monitoring such variables as temperature and power use. The management module may contain an Ethernet interface by which a system administrator may configure the management module. The management module or other components of BladeCenter 160 may be configured to maintain one IP configuration for communication with other nodes in campus LAN 135 and to maintain another IP configuration (private IP configuration) for IP communications between the management module or other components and an end node such as a laptop with a direct IP connection to the management module or other components. In some embodiments, the laptop or other end node may have a direct IP connection only to the management module or other components. The management module or other components may be further configured to detect a direct IP connection between the management module or other components and the laptop or other end node. The management module or other components may be further configured to activate the private IP configuration based upon the detection. BladeCenter 160 is connected to management LAN 115 via hardwire connection 155 and to campus LAN 135 via hardwire connection 150.

Management LAN 115 includes a plurality of nodes 120, 121 and switches 125, 126 connected by IP connections such as IP connection 130 and IP connection 132. Management LAN 115 may transmit messages sent according to the Internet Protocol. Nodes are devices which connect to a network such as management LAN 115. The nodes 120 and 121 may consist of workstations, laptops, servers, file storage, printers, embedded systems, and other network-enabled devices. The nodes 120 and 121 of management LAN 115 may operate to manage the BladeCenter 160.

The switches 125 and 126 are also nodes of management LAN 115. The switches 125 and 126 are devices which direct traffic among the nodes 120 and 121. A message may travel from a node 120 or 121 to a switch 125 or 126. The switch 125 or 126 then examines the address of the message and relays the message to the proper destination. In management LAN 115, when a node 120 or 121 directly connected to a switch 125 or 126 sends a message to another node directly connected to the switch, the switch may forward the message directly to the destination node. For example, the nodes 121 are directly connected to switch 126 by IP connections such as IP connection 132. If one of the nodes 121 sends an IP message to another node 121, the message may travel from the originating node 121 to switch 126 and then to the destination node 121. When the destination node is connected to the other switch, the receiving switch forwards the message to the other switch. For example, if a node 120 sends a message to a node 121, the message might travel from node 120 to switch 125, from switch 125 to switch 126, and from switch 126 to node 121.

In management LAN 115, the nodes 120 and 121 are end nodes. Messages may originate or terminate at the nodes 120 and 121, but do not pass through the nodes 120 and 121 on route to another destination. In the embodiment of FIG. 1, the end nodes 120 and 121 have a direct IP connection to only one other node, the switches 125 or 126. In the embodiment of FIG. 1, there is no direct IP connection between end nodes. In other embodiments, an end node may be connected to multiple nodes, so long as messages between the other nodes are not relayed through the end node. For example, to provide redundancy, a network may connect end nodes to multiple switches. If one switch fails, the end node is still connected to the network through the other switch.

Management LAN 115 may constitute an Ethernet network and the connections 130, 132 may constitute Ethernet connections. An Ethernet network conforms to the specifications described in Institute of Electrical & Electronics Engineers (IEEE) Standard 802.3™. Under the specifications, a network is divided into segments and messages sent through a segment are transmitted to each node in the network segment. In management LAN 115, each node 120 may be joined with switch 125 to form separate segments, and each node 121 may be joined with switch 126 to form separate segments. Each of these segments contains one node 120 or 121 and one switch 125, 126. Messages from an end node 120 or 121 may travel to a switch 125 or 126 without traveling through any intermediary node.

The medium over which signals travel in an Ethernet network may consist of twisted pair wiring or fiber optic cabling. Some Ethernet networks support full duplex. A node may transmit and receive at the same time. The Ethernet cabling may contain a pair of cables, one for transmitting and one for receiving. Two devices on an Ethernet network may be connected by standard cabling, in which the transmit pin of one device is connected to the transmit pin of another device, or may be connected by cross-over wiring, in which the transmit pin of one device is connected to the receive pin of the other device and vice versa. A connection by standard cabling is straight-through and a connection by crossed-over wiring is said to be crossed-over. A connection between a switch and an end node such as connection 132 between switch 126 and end node 121 may be a straight-through Ethernet connection. A controller on the switch may operate to properly handle the signal. A connection between two switches such as connection 130 between switch 125 and switch 126 may be a crossed over Ethernet connection. Some switches and other network devices can handle both kinds of wiring. Two such switches may be connected with either straight-through cabling or cross-over cabling. In alternate embodiments, the management LAN 115 may constitute another type of IP network and the connections 130, 132 may constitute other types of connections.

DHCP server 105 is connected to management LAN 105 through wireline connection 110. DHCP server 105 may provide dynamic IP addresses to the nodes 120 and 121 of management LAN 115. When a node 120 or 121 is connected to management LAN 115, it may connect to DHCP server 105 and receive an IP address. The node 120 or 121 may receive different IP addresses at different times. IP addresses which may change are called dynamic.

Campus LAN 135 includes workstation 140 connected by wireline connection 145. Campus LAN 135 may provide connectivity between the buildings on a campus or industrial center. Redundancy is usually a requirement. Workstation 140 is an example of the nodes that may be connected to campus LAN 135. Nodes may include workstations, servers, laptops, desktops, PDAs, embedded systems and other computing devices capable of network connection. Campus LAN 135 may provide a connection between BladeCenter 160 and other BladeCenters and other LANs, and a connection between BladeCenter 160 and Management LAN 115 and public network 170. Firewall 165 is connected to campus LAN 135 through wireline connection 175 and to public network 170 through wireline connection 180.

In a network such as one of the networks in group of interconnected networks 100, a spanning tree algorithm may ascertain the topology or shape of the network. Under the algorithm, nodes in the network send each other information about their individual connections. This information is patched together to produce the topology of the entire network. One form of spanning tree algorithm, adopted as Standard 802.1d by IEEE is used to find the best paths for switches to communicate with nodes. A version of the spanning tree algorithm may be used to detect a direct IP connection between two end nodes. The algorithm may detect a direct IP connection between an end node and another node, where the other node has a direct IP connection only to the end node. A node may send messages to the nodes to which it is directly connected (direct neighbors), listing its direct neighbors, and may receive similar messages from the node's direct messages. If a direct neighbor of the node has the node as the direct neighbor's only direct neighbor, then the node is directly connected to a node (the direct neighbor) which is directly connected only to the node. In addition, the direct neighbor, with only one direct IP connection, is an end node.

The arrangement of the networks and accompanying devices making up the exemplary system illustrated in FIG. 1 is for explanation, not for limitation. Other embodiments may consist of a single private network, a single public network, or other connected groups of networks as will occur to those of skill in the arts. LANs useful in such networks or groups of networks may operate without switches, or may include additional switches, routers, hubs, repeaters, gateways, other devices, and peer-to-peer architectures, not shown in FIG. 1, as will occur to those of skill in the art. Networks in such data processing systems may support many data communications protocols, including for example TCP (Transmission Control Protocol), HTTP (HyperText Transfer Protocol), WAP (Wireless Access Protocol), HDTP (Handheld Device Transport Protocol), and others as will occur to those of skill in the art. Other embodiments may be implemented on a variety of hardware platforms in addition to those illustrated in FIG. 1. In particular, some embodiments may not involve Blade-Centers.

Figure 2:
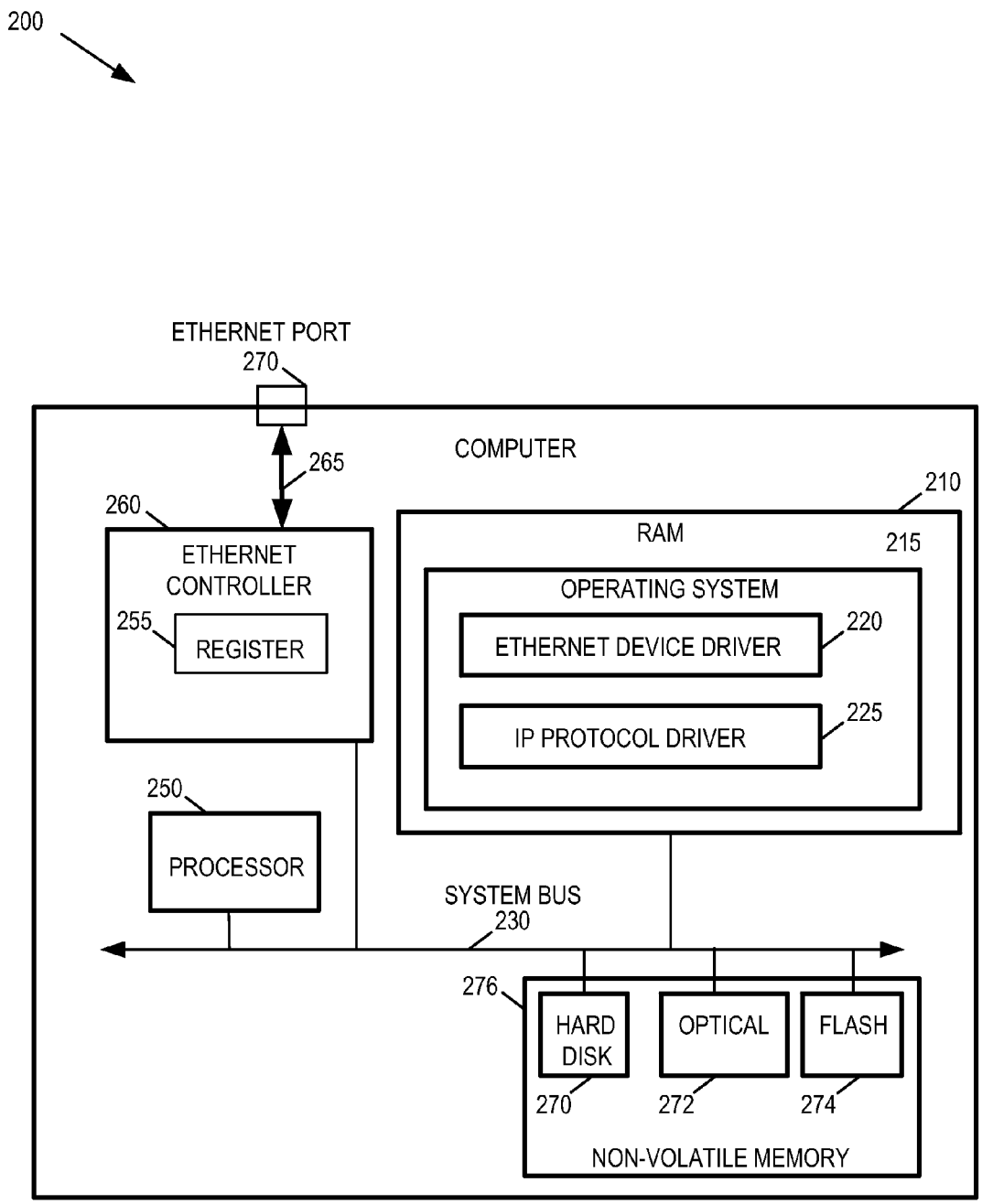
FIG. 2 depicts an embodiment of a computer which may activate at least two IP configurations.

Turning to FIG. 2, shown is an embodiment of a node consisting of a computer 200 with random access memory (RAM) 210, a processor 250 or CPU, non-volatile storage 276, and an Ethernet controller 260 connected by system bus 230. Ethernet controller 260 includes register 255 and is connected to Ethernet port 270 through connection 265. Ethernet controller 260 implements the hardware level of data communications through which one computer sends data communications to another computer, directly or through a network according to the Ethernet (IEEE 802.3) protocol for wired network communications. Ethernet controller 260 may determine whether an Ethernet connection is straight-through or crossed over and may store a value in register 255 to indicate the kind of Ethernet connection. Ethernet controller 260 may generate an interrupt when there is a change in the kind of connection.

Stored in RAM 210 is an operating system 215 which includes an Ethernet device driver 220 and an IP protocol driver 225. Operating system 215 may supervise the running of the computer, coordinating the running of applications and other processes and the operation of the hardware of computer 200. Ethernet device driver 220 comprises computer program instructions which interface with the Ethernet controller 260 to transmit and receive data through the Ethernet port 270. Ethernet device driver 220 may take data which has been received through the Ethernet port and transmit it to applications and other processes which are making use of the data. IP protocol driver 225 comprises computer program instructions to enforce compliance with the Internet Protocol in network communications. In particular, IP protocol driver 225 controls the processing of IP packets. IP protocol driver 225 may maintain data for IP communications in IP configurations. IP protocol driver 225 may maintain multiple IP configurations; add, delete, or update the IP configurations; and activate an IP configuration suitable for the current IP communication.

An IP configuration is used for communicating over networks according to the IP protocol, a protocol which is often combined with the Transmission Control Protocol to form the TCP/IP communications protocol. An IP configuration may include an IP address, a subnet mask, a next-hop IP address or gateway, and a network interface. In general, each node connected to a network has an assigned IP address which uniquely identifies the node. A node connected to multiple networks may have multiple IP addresses. An IP address serves the same purpose for IP communications as a street address for mail. A node sends a message to another node by forming packets containing data, the IP address of the destination node and the IP address of the transmitting node. Switches, routers, and other devices which handle message traffic may utilize the IP address to forward a packet to the desired destination. An IP address under the current standard may consist of a 32-bit binary number divided into four groups of 8 bits or octets. In a proposed future standard, an IP address may consist of six groups of octets. An IP address is frequently written as four decimal numbers in the range of 0 to 255 separated by periods, such as 192.168.98.112. A 32-bit number IP address has two components, a string of bits indicating a network location, the network ID, and a string of bits indicating a particular node on the network, the host ID. The network ID identifies devices which are located on the same physical network. The host ID is used to identify a particular host within a network. IP addresses may be routable or non-routable. Routable addresses are recognized by routers, devices which connect multiple networks. Non-routable addresses may be known only within a network. A node from outside the network could not use a non-routable address to send a message to a node inside the network. IP addresses may be static or dynamic. A node retains a static address, and is assigned a possibly-different dynamic address for each session; for example, by a DHCP server.

The subnet mask component of an IP configuration may be associated with the division of a larger network into smaller sub-networks. A large network may be divided into smaller sub networks by using a portion of the host number field to specify sub networks. For example, the network 130.5 may be identified by the first two octets, or first 16 bits, of an IP address. The remaining two octets are available to specify hosts. An administrator may choose to divide the network into 8 sub networks. The sub networks may consist of LANs or WANs. In this case, the leftmost 3 bits of the host ID portion of an IP address may indicate the sub network. In total, 19 bits of the IP address would represent network information, 16 bits for the main network and 3 for the subnet. The position of these bits in the IP address may be identified by a subnet mask, which may consist of is corresponding to the bits in the IP address which contain the network and sub network address. In the above example, the subnet mask may consist of 19bits of 1s followed by 13 bits of 0s, in binary representation:

11111111.11111111.11100000.00000000 and in decimal representation:

255.255. 224.0

An IP configuration may include also an identification of a network interface card, hardware for physically connecting to a network. A computer may, for example, have separate network interface cards for connecting to a network via an Ethernet connection, by a modem, and by wireless. An IP configuration of a node may also include an IP address of a next-hop node or gateway, the node to which packets is sent to directly. For example, for a home computer with a network connection provided by an Internet service provider, the gateway is a router or switch maintained by the Internet service provider.

IP configurations may be maintained in tables. In the Windows operating system, IP configuration values may be stored in the registry. Values in the table may be added, deleted, or modified by writing to the registry. In the UNIX operating system, operating system commands may be used to manage IP configurations. For example, the command ipconfig may be used to configure a network interface. The syntax is:

Ipconfig [interface] [command] [address] [options]

where interface is the name of a network interface, command is a command, address is an IP address, and options indicate various options. Similarly, the information used to specify a current IP configuration may be maintained in a routing table. An IP configuration may be activated by placing the data for the configuration, such as an IP address and network interface card for the node, a next-hop address, and a subnet mask in the routing table. IP protocol driver 225 may store data about the IP configurations in non-volatile memory 276. Non-volatile computer memory (166) may be implemented as a hard disk drive 270, optical disk drive 272, electrically erasable programmable read-only memory space (EEPROM or Flash memory) 174, RAM drives (not shown), or as any other kind of computer memory as will occur to those of skill in the art.

Computer 200 may comprise an end node of an IP network such as a LAN. IP protocol driver 225 may maintain a first IP configuration for connecting to other nodes on the network through a switch or router or other device to handle network traffic. The IP protocol driver 225 may receive a dynamic IP address for the first IP configuration from a DHCP server attached to the network. The IP protocol driver 225 may maintain a second IP configuration for IP communications between the computer 200 and another end node with a direct IP connection to computer 200. IP protocol driver 225 may activate the second IP configuration upon detecting a direct IP connection of computer 200 and another end node. In some embodiments, the other end node may have a direct IP connection only to computer 200. IP protocol driver 225 may examine the contents of register 255 to detect a direct IP connection of computer 200 and another end node, either by polling or when receiving an interrupt from Ethernet controller 260. Ethernet controller 260 may determine whether an Ethernet connection is straight through or crossed over, and may place a value in register 255 indicating the type of connection. A crossed over connection may indicate a direct IP connection between computer 200 and another end node. This automatic switching of IP configurations may enable the easy configuring of a node. A system administrator may connect a laptop to the node with a crosswire cable. The laptop may be an end node. The laptop may not be configured to act as a router or other device for forwarding network traffic. In particular, the laptop may have a direct IP connection only to the node. The node may then switch to an IP configuration suitable for the laptop to communicate with the node through the crosswire connection according to the Internet Protocol. If the automatic switching of configurations was not available, the system administrator may have to manually provide a suitable IP configuration to the node, a time-consuming process.

The computer and components illustrated in FIG. 2 are for explanation, not for limitation. In other embodiments, embedded systems, PDAs, and other devices which function as end nodes may activate an IP configuration upon the detection of a direct IP connection of the device with another end node. In some embodiments, components of a device other than an Ethernet controller may detect the direct IP connection. In other embodiments, a spanning tree algorithm may be used to detect the direct IP connection. In other embodiments, components of a device other than an IP protocol driver may maintain and activate IP configurations. In some embodiments, an embedded system may maintain and activate the configurations. In some embodiments, IP configurations may be activated under the supervision of the basic input/output system (BIOS). In further embodiments, BIOS may detect from Ethernet controller 260 when a connection is crossed-over. In some of these embodiments, when the connection is crossed-over, the system may default to the IP configuration suitable for the connection to another end node. The system may further boot into diagnostic mode or into the BIOS setup menu.

Figure 3:
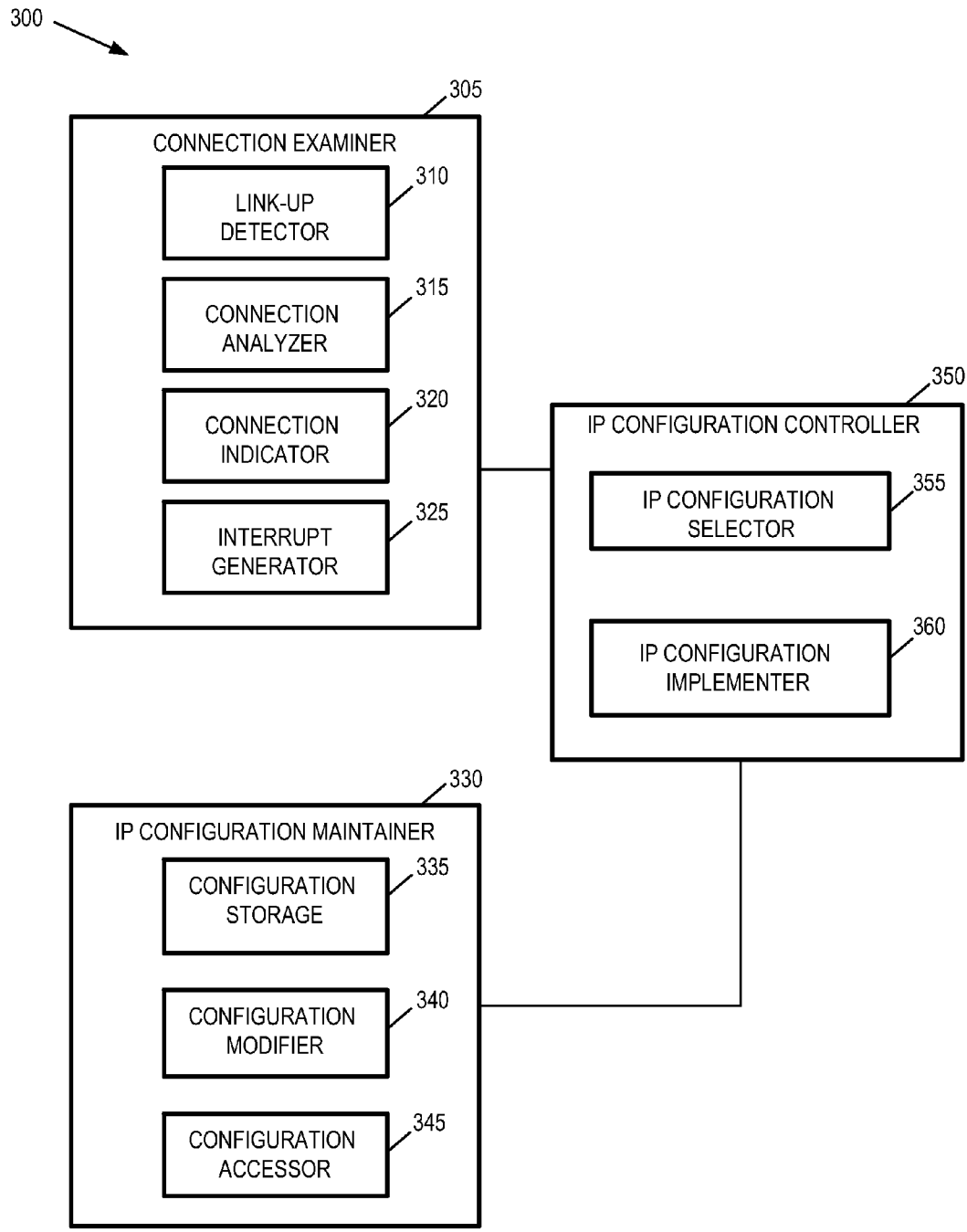
FIG. 3 depicts an embodiment of an IP configuration manager 300 for a network-enabled device.

Turning to FIG. 3, depicted is an embodiment of an IP configuration manager 300 for a network-enabled device that includes a connection examiner 305, an IP configuration maintainer 330, and an IP configuration controller 350. The network-enabled device may constitute an end node. IP configuration manager 300 may activate an IP configuration on the device suitable for a direct IP connection between the device and another network-enabled device upon detecting a direct IP connection between the two devices and detecting that the other device is another end node. Connection examiner 305 may include a link-up detector 310, a connection analyzer 315, a connection indicator 320, and an interrupt generator 325. Connection examiner 305 may analyze and report on the type of network connection or connections of the device. Link-up detector 310 may detect a network connection or link-up between the device and another network-enabled device.

Connection analyzer 315 may determine the type of network connection, and, in particular, whether the connection is a direct IP connection to another end node, such as a node with a direct IP connection only to the device. In some embodiments, connection analyzer 315 may determine whether a network connection is straight-through or crossed-over. A crossed-over connection may indicate a direct IP connection to another end node. Connection analyzer 315 may determine whether an Ethernet connection is straight-through or crossed-over; that is, whether the connection involves cross-over cabling or standard cabling. In a LAN, for example, two switches or two end nodes may be connected by cross-over cable. In other embodiments, the connection analyzer 315 may use a spanning tree algorithm to determine whether a direct IP connection with another device is the other direct IP connection of the other device. Connection indicator 320 may store a value indicating the type of connection. In some embodiments, connection indicator 320 may consist of a register on an Ethernet controller which contains a value indicating the type of connection. Interrupt generator 325 may generate a system interrupt to announce a change in the type of connection.

IP configuration maintainer 330 may include configuration storage 335, configuration modifier 340, and configuration accessor 345. IP configuration maintainer 330 may provide for the storage, modification, and retrieval IP configurations. Configuration storage 335 may record IP configurations for retrieval by IP configuration controller 350. In some embodiments, IP configuration storage 335 may consist of non-volatile memory such as a hard disk drive, flash memory, or optical memory. Configuration modifier 340 may modify IP configurations stored by configuration storage 335. For example, if a network administrator changes a static IP address for a node, the configuration modifier 340 may modify a stored IP configuration to reflect the changes. Similarly, configuration modifier 340 may add or delete IP configurations for the device. Configuration accessor 345 provides access to the stored IP configurations. For example, IP configuration controller 350 may access the stored IP configurations to select a configuration suitable for the current connection.

IP configuration controller 350 includes IP configuration selector 355 and IP configuration implementer 360. IP configuration controller 350 may determine a suitable IP configuration for the current network connection and activate the suitable IP configuration. In some embodiments, IP configuration controller 350 may constitute an IP protocol driver, a component of the operating system. In other embodiments, IP configuration controller 350 may constitute a component of an embedded system. IP configuration selector 355 may determine an appropriate IP configuration for the current network connection. IP configuration selector 355 may access the IP configurations maintained by IP configuration maintainer 330 in selecting an appropriate IP configuration. For example, when a network connection provides access to a DHCP server, IP configuration selector 355 may select an IP configuration suitable to obtain an IP address from the DHCP server. When there is a direct IP connection between the device and another end node, IP configuration selector 355 may select an IP configuration suitable for the direct IP connection. In some embodiments, a suitable configuration may include a static, non-routable IP address which has been published. In other embodiments, a suitable configuration may include a variable IP address. IP configuration implementer 360 may activate the IP connection selected by IP configuration selector 355. In some embodiments, the current IP configuration may be represented by a data structure. An IP configuration may be activated by modifying the data structure. For further example, under the Windows operating system, the parameters of an IP configuration may be stored in the Windows registry.

Figure 4:
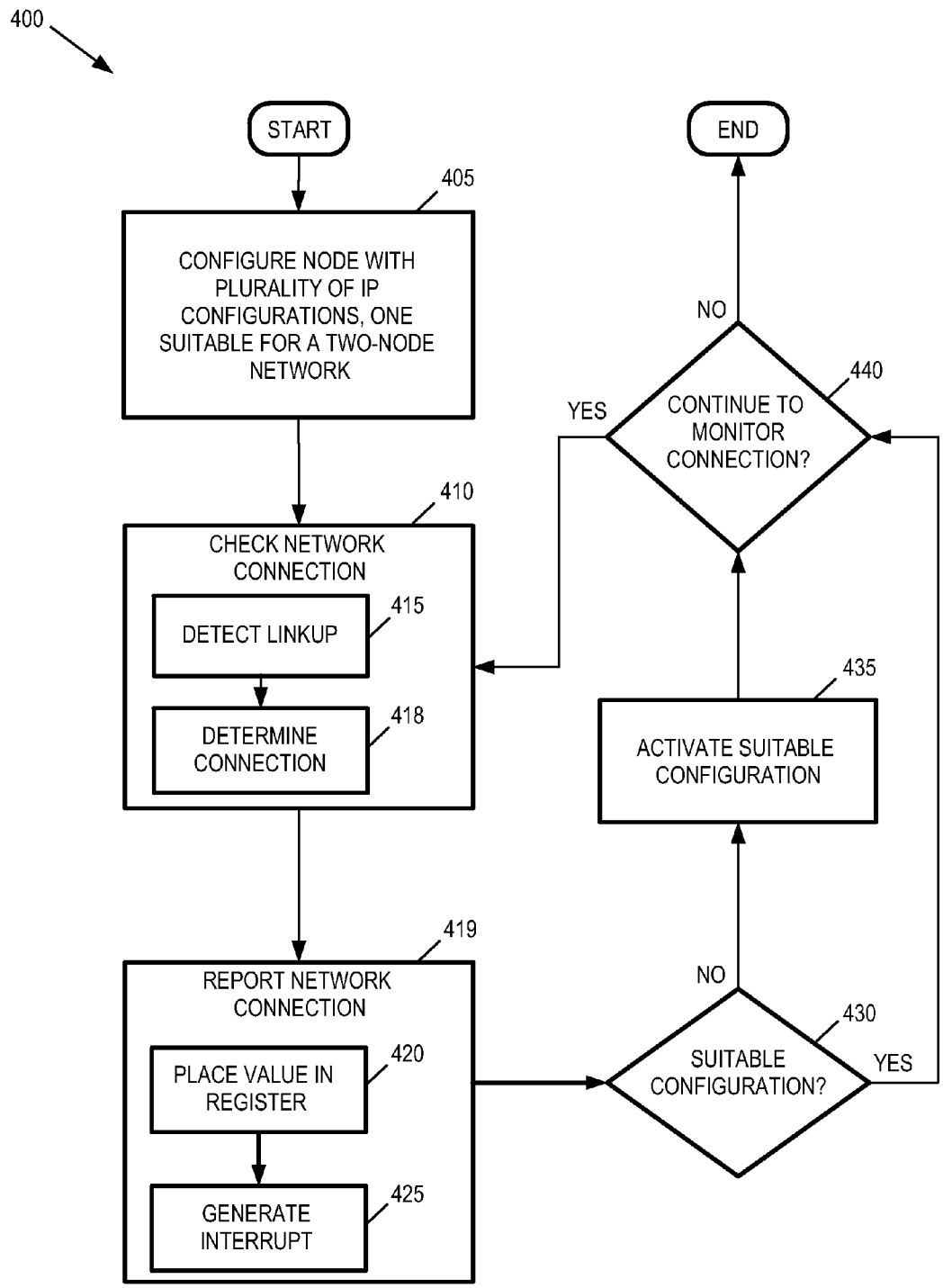
FIG. 4 depicts a flowchart of an embodiment to activate IP configurations based upon the network connection.

FIG. 4 depicts a flowchart of an embodiment to activate an IP configuration. Flow chart 400 begins with configuring an end node with a plurality of IP configurations (element 405), one configuration suitable for the direct connection of two end nodes, such as a two-node network. End nodes may include workstations, servers, laptops, desktops, PDAs, embedded systems and other computing devices capable of network connection. A two-node network may consist of two end-nodes such as a laptop and a BladeCenter management module directly connected at their Ethernet ports with cross-wire cable. A suitable IP configuration for the two-node network may include a static IP address which has been published, so that an administrator operating the laptop may connect to the BladeCenter management module through the IP address.

The type of network connection or connections of the end node is then checked (element 410). Element 410 involves two sub elements. First, a link-up or communications channel is detected (element 415). For example, a node may connect through an Ethernet connection, over a modem, or by a wireless connection. Next, the type of connection is determined (element 418). For example, a connection may be a direct IP connection to another end node. In some embodiments, the other end node has a direct IP connection only to the end node.

In other embodiments, the other end node may have other direct IP connections. The other end node, for example, may be connected to the end node through a cross-wire cable and connected to a router in another network through a wireless card. In one embodiment, a direct IP connection between end nodes may be detected by an Ethernet controller which can determine whether an Ethernet connection is straight-through or crossed-over. A straight-through connection may involve a connection with a switch or router and a crossed-over connection may constitute a direct IP connection to another end node. In another embodiment, such a connection may be detected by use of a spanning tree algorithm to determine network topology.

The type of network connection or connections is then reported (element 419). Element 419 involves two sub elements. A value indicating a kind of connection may be placed in a register of an Ethernet controller (element 420). The Ethernet controller may then generate an interrupt (element 425). The interrupt handler may then determine whether the current IP configuration is suitable for the type of network connection indicated by the register value (element 430). If the IP configuration is not suitable for the connection, the interrupt handler may activate a suitable configuration (element 435). For example, if the IP configuration is suitable for a connection to a LAN through a switch, and the connection is a direct IP connection to another end node, then the IP configuration suitable for the direct connection of two end nodes may be activated. Conversely, if the connection is to a switch on a LAN, a suitable IP configuration may be activated. The IP configuration may provide for receiving a dynamic IP address through a DHCP server. If the IP configuration was suitable or is made suitable for the connection, and continued monitoring of the connection is desired (element 440), then the elements from 410 to 435 may be repeated. Otherwise, if the monitoring is not to continue, the activating of IP configurations may end.

Another embodiment of the invention is implemented as a program product for activating IP networks. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention. In general, the routines executed to implement the embodiments of the invention may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods and arrangements for activating IP configurations. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of activating Internet Protocol (IP) configurations, the method comprising:

configuring an end node with a first and a second IP configuration for a network interface of the end node, wherein the first IP configuration includes a first IP address, the second IP configuration is suitable for IP communications between directly connected end nodes, and the second IP configuration includes a second IP address of the end node;

detecting a change in a connection of the network interface of the end node from a direct connection between the network interface of the end node and a first other node to a direct IP connection between the network interface of the end node and a second other node, the second other node comprising an end node, each direct IP connection via a cable extending from the end node to another node;

automatically switching from the first IP configuration for the network interface to the second IP configuration for the network interface, the switching comprising switching from the first IP address to the second IP address, the switching based upon the detection; and communicating with the second other node through the cable extending from the end node to the second other node via the network interface and via the second IP configuration, the communicating using the second IP address.

2. The method of claim 1, wherein the configuring comprises configuring the end node with the second IP configuration, wherein the second IP configuration includes the second IP address, comprising a static, non-routable IP address.

3. The method of claim 1, wherein the detecting comprises detecting
that the second other node has a direct IP connection only to the end node.

4. The method of claim 1, wherein the detecting comprises detecting a crosswire cable connecting the end node and the other end node.

5. The method of claim 1, wherein the detecting comprises utilizing a spanning tree algorithm.

6. The method of claim 1, wherein the detecting comprises:
receiving an interrupt in the end node; and
examining a register on an Ethernet controller of the end node.

7. The method of claim 1, wherein the switching comprises executing instructions in a basic input/output system (BIOS) of the end node.

8. The method of claim 1, wherein:
the detecting comprises detecting by a device driver of an operating system of the end node; and
the switching comprises switching by the device driver.

9. An apparatus to activate an Internet Protocol (IP) configuration, the apparatus comprising:
a processor;
a connection detector of a first end node to detect a change in a wired connection of the network interface of the first end node from a direct connection between the network interface of the first end node and a third node to a direct IP connection between the first end node and a second end node through a network interface of the first end node;
an IP configuration manager of the first end node to:
maintain a first IP configuration of the first end node for IP communications between the first end node and the second end node through the network interface of the first end node in a first IP network, the first IP configuration including a first IP address of the first end node;
maintain a second IP configuration of the first end node for the connection of the first end node to another IP network through the network interface, the second IP configuration including a second IP address of the first end node; and
automatically switch from the second IP configuration for the network interface to the first IP configuration for the network interface based upon the detection, the switching comprising switching from the second IP address to the first IP address; and
an IP communications module of the first end node to communicate with the other end node through the direct IP connection via the network interface and via the first IP configuration, the communicating using the first IP address, wherein the direct connection comprises a cable extending from the first end node to the second end node.

10. The apparatus of claim 9, wherein:
the connection detector comprises an Ethernet controller of the first end node; and
the connection detector is configured to generate an interrupt of the first end node when the connection detector detects a direct IP connection between the first end node and the second end node.

11. The apparatus of claim 10, wherein the Ethernet controller
comprises a register of the first end node to store a value to indicate a direct IP connection between the first end node and the second end node.

12. The apparatus of claim 9, wherein the IP configuration manager comprises an embedded system of the first end node.

13. The apparatus of claim 9, wherein the IP configuration manager comprises a basic input/output system (BIOS) of the first end node.

14. The apparatus of claim 9, wherein the IP connection manager comprises a device driver of an operating system of the first end node.

15. A computer program product for activating an Internet Protocol (IP) configuration, the computer program product comprising:
a computer readable storage device;
first program instructions to configure an end node with a first and a second IP configuration for a network interface of the end node, wherein the first IP configuration includes a first IP address, the second IP configuration is suitable for IP communications between directly connected end nodes, and the second IP configuration includes a second IP address of the end node;
second program instructions to detect a change in a wired connection of the network interface of the end node from a direct connection between the network interface of the end node and a first other node to a direct IP connection between the network interface of the end node and a second other node, the second other node comprising an end node, each direct IP connection via a cable extending from the end node to another node;
third program instructions to automatically switch from the first IP configuration for the network interface to the second IP configuration for the network interface, the switching comprising switching from the first IP address to the second IP address, the switching based upon the detection; and
fourth program instructions to communicate with the second other node through the cable extending from the end node to the second other end node via the network interface and via the second IP configuration, the communicating using the second IP address;
wherein the first, second, third, and fourth program instructions are stored on the computer readable storage device.

16. The computer readable storage device of claim 15, wherein the first program instructions comprise instructions to configure the end node with the second IP configuration, wherein the second IP configuration includes the second IP address, comprising a static, non-routable IP address.

17. The computer readable storage device of claim 15, wherein the second program instructions comprise instructions to detect a crosswire cable connecting the end node and the second other node.

18. The computer readable storage device of claim 15, wherein the second program instructions comprise instructions to utilize a spanning tree algorithm.

19. The computer readable storage device of claim 15, wherein the second program instructions comprise instructions to:
receive an interrupt in the end node; and
examine a register on an Ethernet controller of the end node.

20. The computer readable storage device of claim 15, wherein:
the second program instructions comprise instructions to detect by a device driver of an operating system of the end node; and
the third program instructions comprise instructions to switch by the device driver.

* * * * *